(12) United States Patent
Mima

(10) Patent No.: US 9,465,280 B2
(45) Date of Patent: Oct. 11, 2016

(54) PROJECTOR APPARATUS AND PROJECTOR SUPPORT TABLE

(71) Applicant: Panasonic Intellectual Property Management Co., Ltd., Osaka (JP)

(72) Inventor: Kunihiro Mima, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/742,732

(22) Filed: Jun. 18, 2015

(65) Prior Publication Data

US 2015/0370154 A1     Dec. 24, 2015

(30) Foreign Application Priority Data

Jun. 24, 2014   (JP) .................................. 2014-128755
Apr. 16, 2015   (JP) .................................. 2015-083822

(51) Int. Cl.
    *G03B 21/16*     (2006.01)
    *G03B 21/14*     (2006.01)

(52) U.S. Cl.
    CPC ............ *G03B 21/16* (2013.01); *G03B 21/145* (2013.01)

(58) Field of Classification Search
    CPC .... G03B 21/16; G03B 21/30; G03B 21/145; G06F 1/18; G06F 1/181; G06F 1/184; G06F 1/185; G06F 1/186; H01L 23/34; H01L 23/367; H01L 23/467; H01L 23/427
    See application file for complete search history.

(56) References Cited

U.S. PATENT DOCUMENTS

| | | | |
|---|---|---|---|
| 2002/0021415 A1* | 2/2002 | Fujimori | ................ G03B 21/16 353/31 |
| 2010/0128228 A1 | 5/2010 | Matsuo et al. | |
| 2010/0259935 A1* | 10/2010 | Scordino | ................... F21K 9/00 362/294 |

FOREIGN PATENT DOCUMENTS

JP     2010-164942     7/2010

* cited by examiner

*Primary Examiner* — Sultan Chowdhury
(74) *Attorney, Agent, or Firm* — Wenderoth, Lind & Ponack, L.L.P.

(57) ABSTRACT

A projector apparatus includes a projector and a projector support table. The projector support table includes a turning unit and a fixed unit. The turning unit includes a projector support unit to which the projector can be attached. The fixed unit includes an intake port, and turnably supports the turning unit. The fixed unit also includes a first intake passage through which the intake air taken from the intake port passes. The turning unit also includes an intake air taking port for taking the intake air having passed through the first intake passage, a second intake passage through which the intake air taken from the intake air taking port passes, and an intake air discharging port for discharging, to the intake port of the projector, the intake air having passed through the second intake passage.

14 Claims, 19 Drawing Sheets

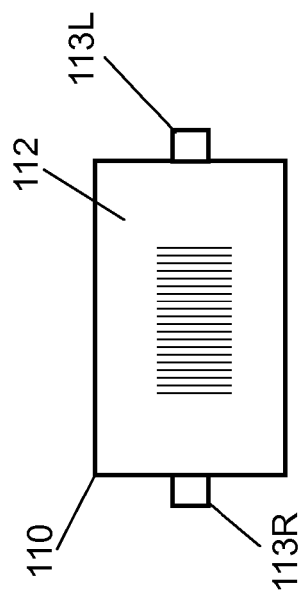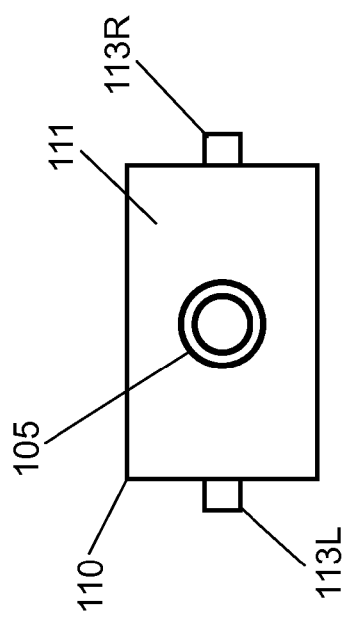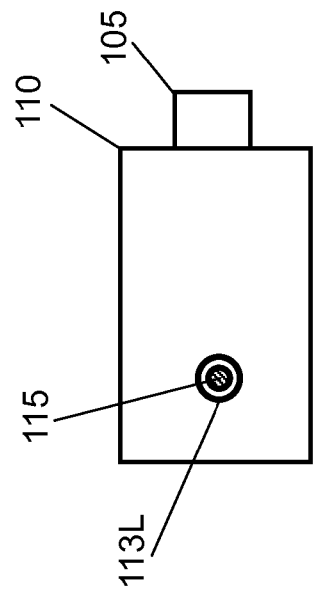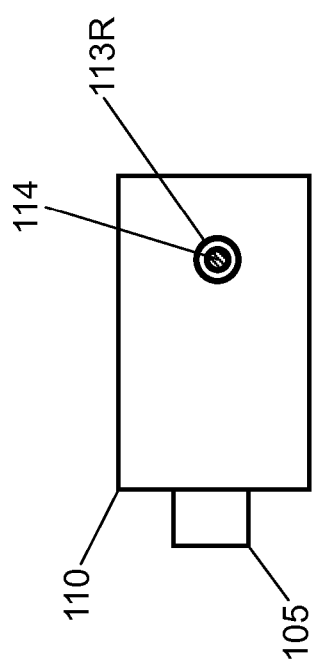

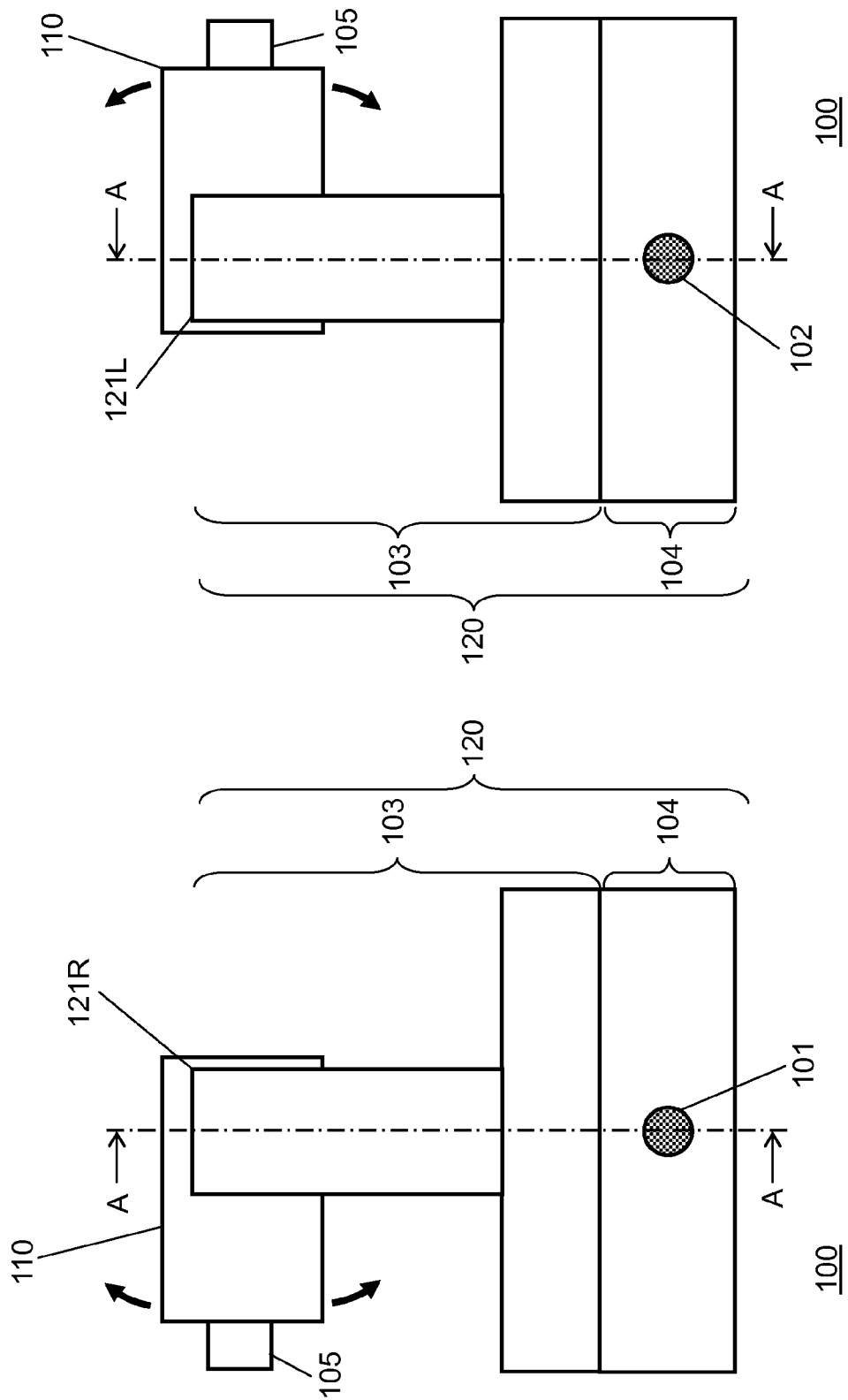

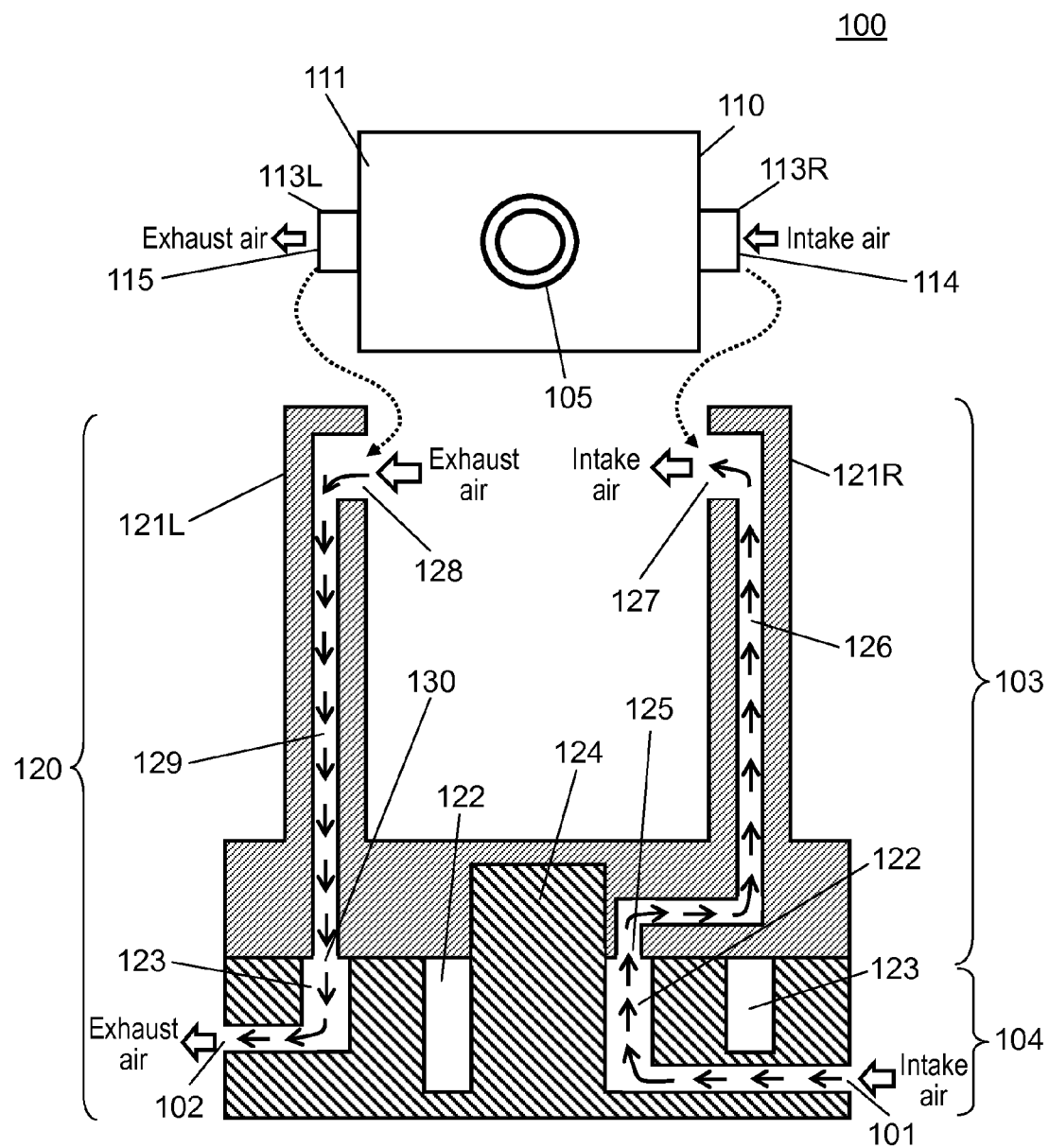

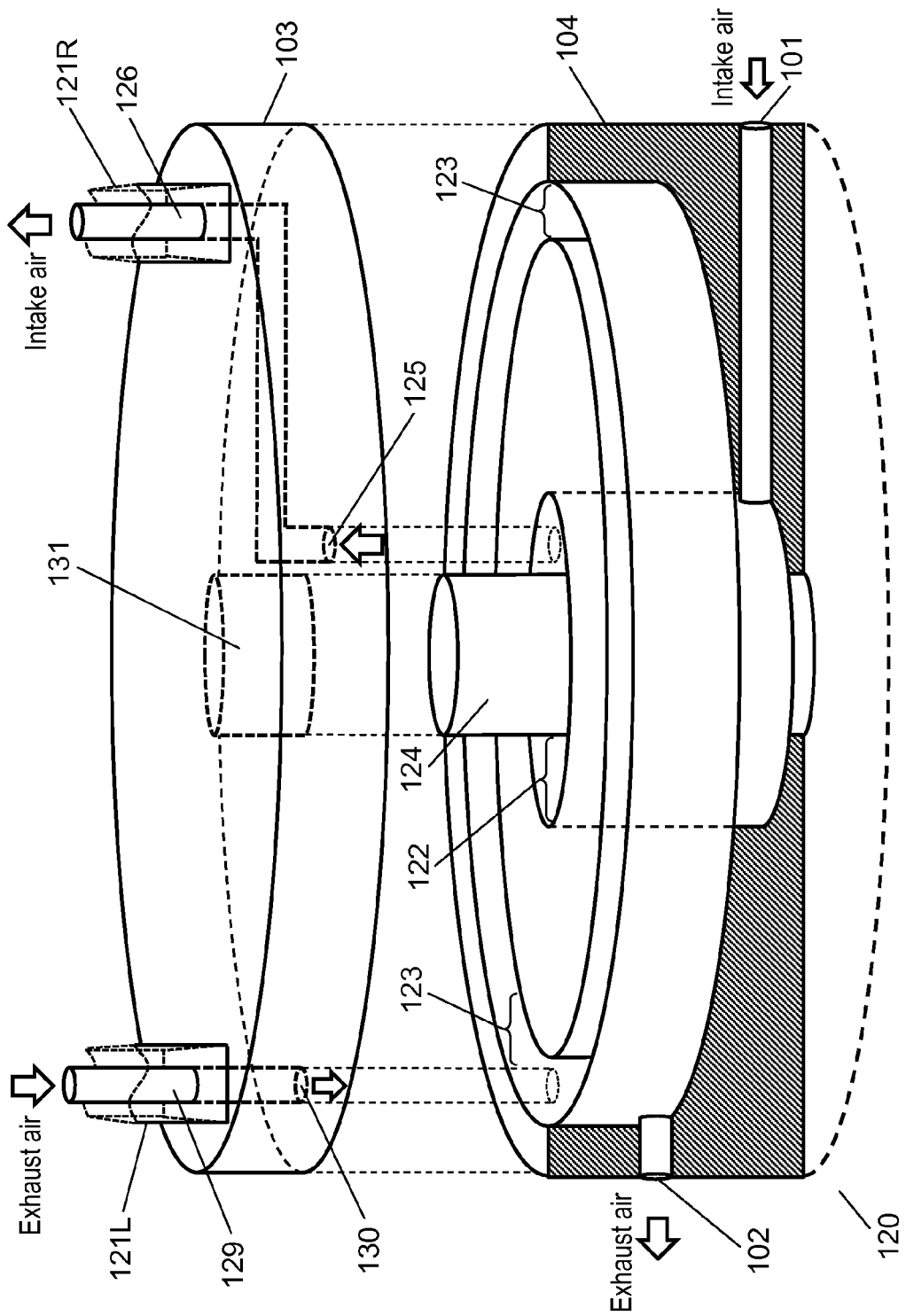

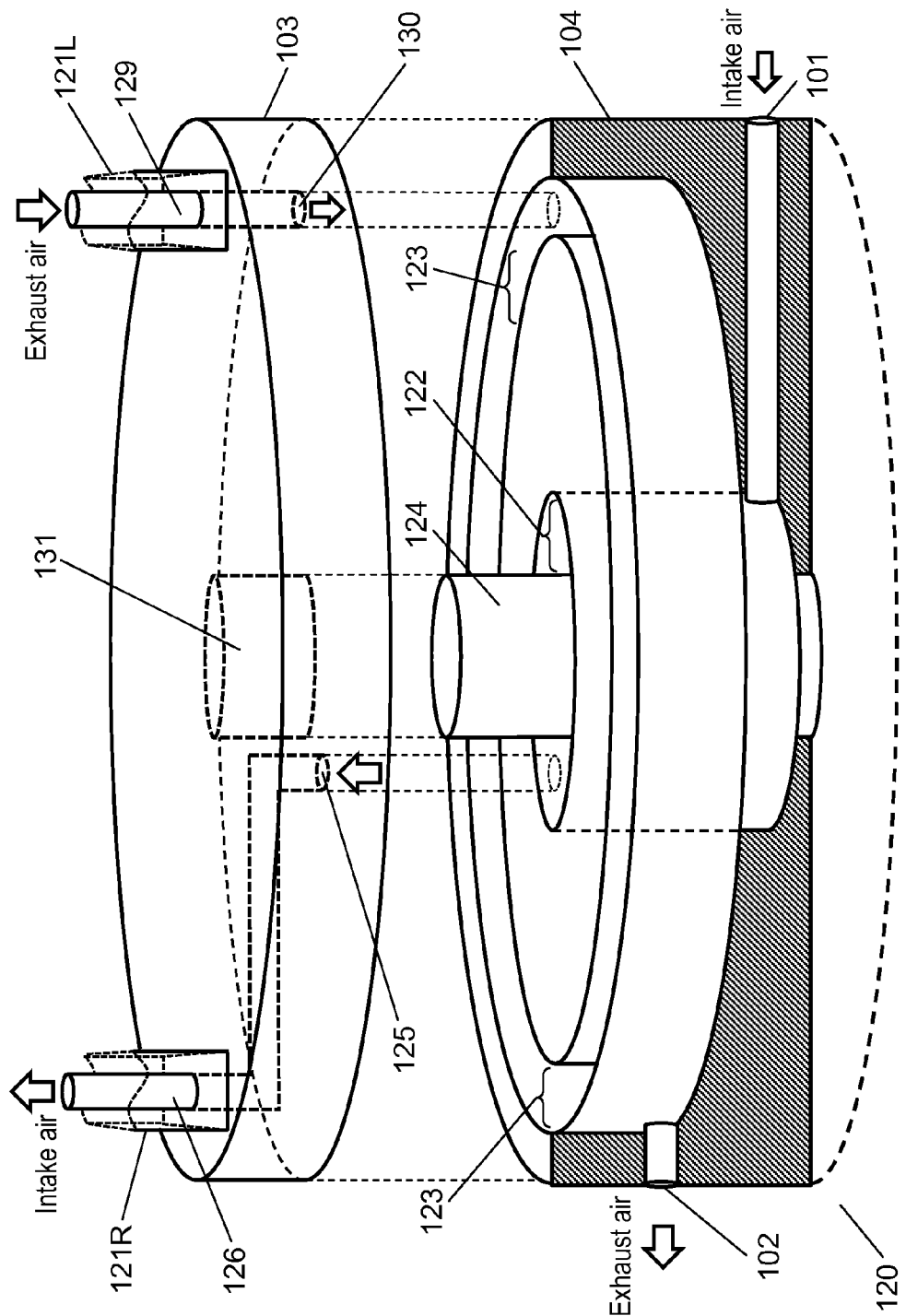

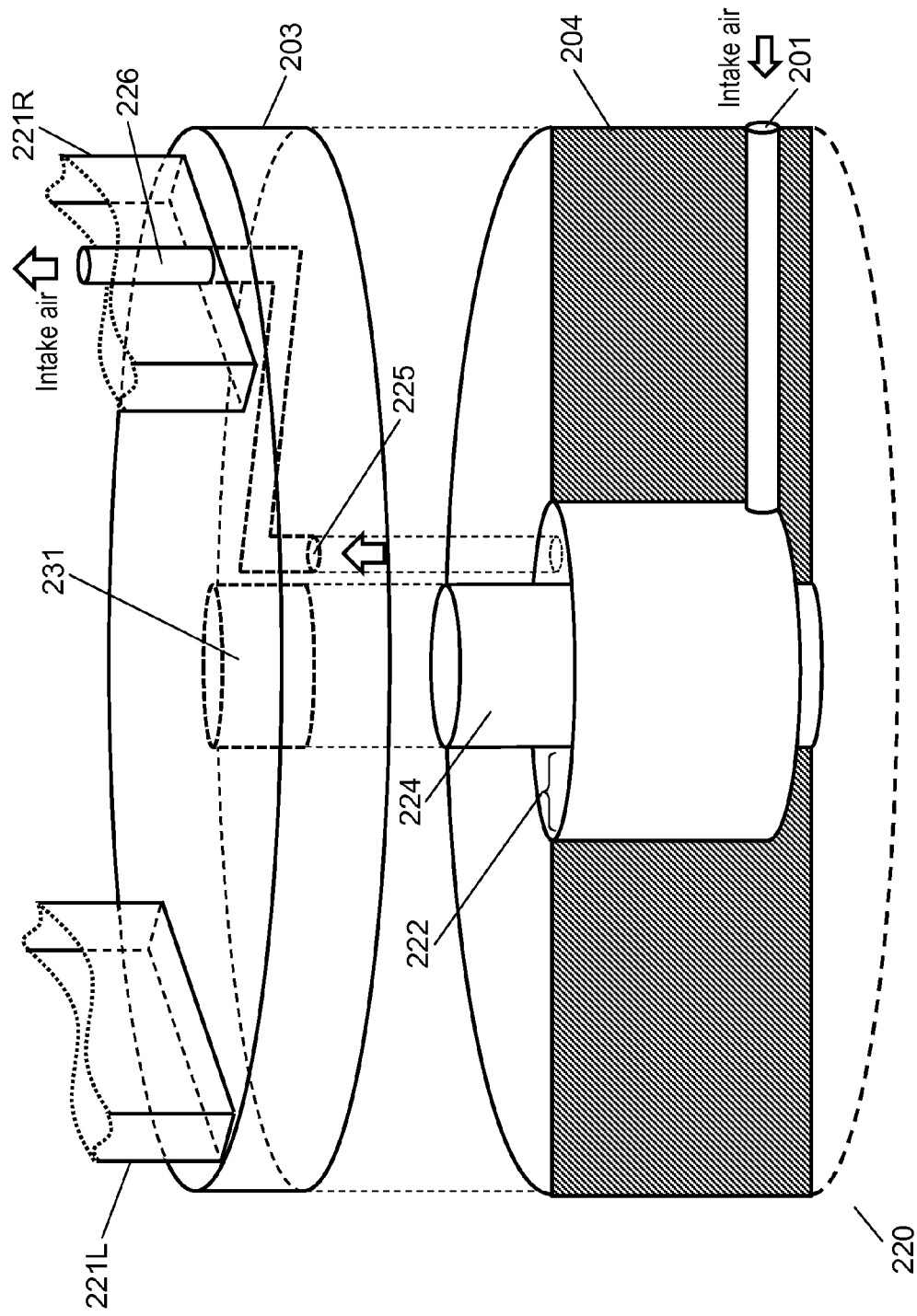

PROJECTOR APPARATUS AND PROJECTOR SUPPORT TABLE

BACKGROUND

1. Field of the Disclosure

The present disclosure relates to a projector apparatus including a projector support table for turnably supporting a projector.

2. Background Art

Unexamined Japanese Patent Publication No. 2010-164942 (Patent Literature 1) discloses a projector system that uses three projectors in a connection state. The projector system has a configuration in which a projector is separated from its adjacent projector via a sealing unit. This configuration prevents the exhaust air coming from one projector from being taken by another projector. In this projector system, thus, the exhaust air from one projector can be prevented from heating another projector.

SUMMARY

The present disclosure provides a projector apparatus formed by mounting a projector to a projector support table for turnably supporting the projector.

The projector apparatus of the present disclosure includes a projector having a mounting unit, and a projector support table for supporting the projector at the mounting unit. The projector support table includes a turning unit and a fixed unit. The turning unit includes a projector support unit to which the mounting unit of the projector is attachable. The fixed unit includes an intake port, and turnably supports the turning unit. The fixed unit also includes a first intake passage through which the intake air taken from the intake port passes. The turning unit also includes an intake air taking port for taking the intake air having passed through the first intake passage, a second intake passage through which the intake air taken from the intake air taking port passes, and an intake air discharging port for discharging, to the intake hole of the projector, the intake air having passed through the second intake passage.

The projector support table of the present disclosure includes a turning unit and a fixed unit. The turning unit includes a projector support unit to which the projector is attachable. The fixed unit includes an intake port, and turnably supports the turning unit. The fixed unit also includes a first intake passage through which the intake air taken from the intake port passes. The turning unit also includes an intake air taking port for taking the intake air having passed through the first intake passage, a second intake passage through which the intake air taken from the intake air taking port passes, and an intake air discharging port for discharging, to the intake hole of the projector, the intake air having passed through the second intake passage.

In the projector apparatus and projector support table of the present disclosure, the video projection direction of the projector can be changed while the position of the intake port is fixed.

BRIEF DESCRIPTION OF DRAWINGS

FIG. 3A is a front view of a projector in accordance with the first exemplary embodiment;

FIG. 3B is a rear view of the projector in accordance with the first exemplary embodiment;

FIG. 3C is a right side view of the projector in accordance with the first exemplary embodiment;

FIG. 3D is a left side view of the projector in accordance with the first exemplary embodiment;

FIG. 4A is a right side view of the projector apparatus in accordance with the first exemplary embodiment;

FIG. 4B is a left side view of the projector apparatus in accordance with the first exemplary embodiment;

FIG. 5A is a sectional view of a projector support table in accordance with the first exemplary embodiment;

FIG. 6A is an exploded perspective view showing an internal structure of the projector support table in accordance with the first exemplary embodiment;

FIG. 6B is another exploded perspective view showing the internal structure of the projector support table in accordance with the first exemplary embodiment;

FIG. 11 is an exploded perspective view showing an internal structure of the projector support table in accordance with the second exemplary embodiment;

DETAILED DESCRIPTION

Hereinafter, the exemplary embodiments will be described in detail appropriately with reference to the accompanying drawings. Description more detailed than necessary is sometimes omitted. For example, a detailed description of a well-known item and a repeated description of substantially the same configuration are sometimes omitted. This is for the purpose of preventing the following descriptions from becoming more redundant than necessary and allowing persons skilled in the art to easily understand the exemplary embodiments.

The accompanying drawings and the following descriptions are provided to allow the persons skilled in the art to sufficiently understand the present disclosure. It is not intended that they restrict the main subject described within the scope of the claims.

In the following descriptions, for convenience sake, the projection direction of video light by a projector is assumed "forward", and the opposite direction is assumed "backward".

First Exemplary Embodiment

The first exemplary embodiment is hereinafter described with reference to FIG. 1 to FIG. 6A and FIG. 6B.

[1-1. Configuration]

Figure 1:
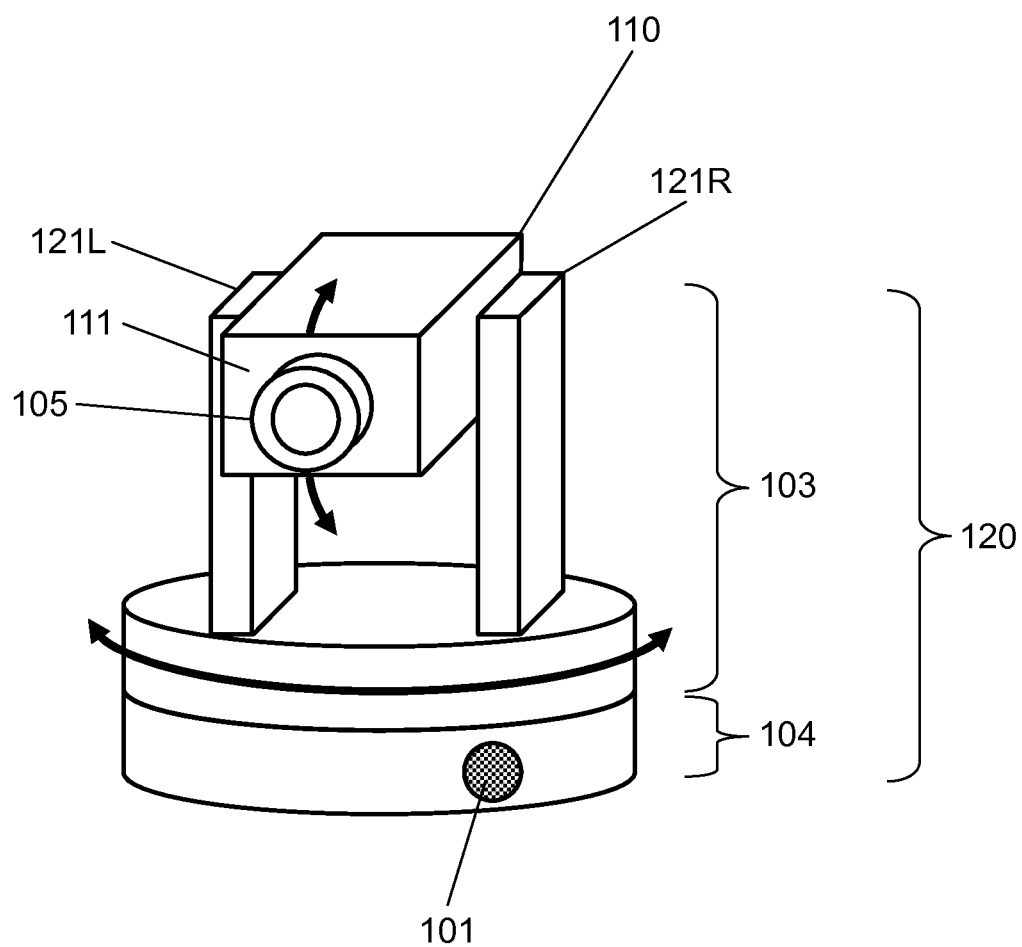
FIG. 1 is a perspective view from the front and top right of a projector apparatus in accordance with a first exemplary embodiment.
Figure 2:
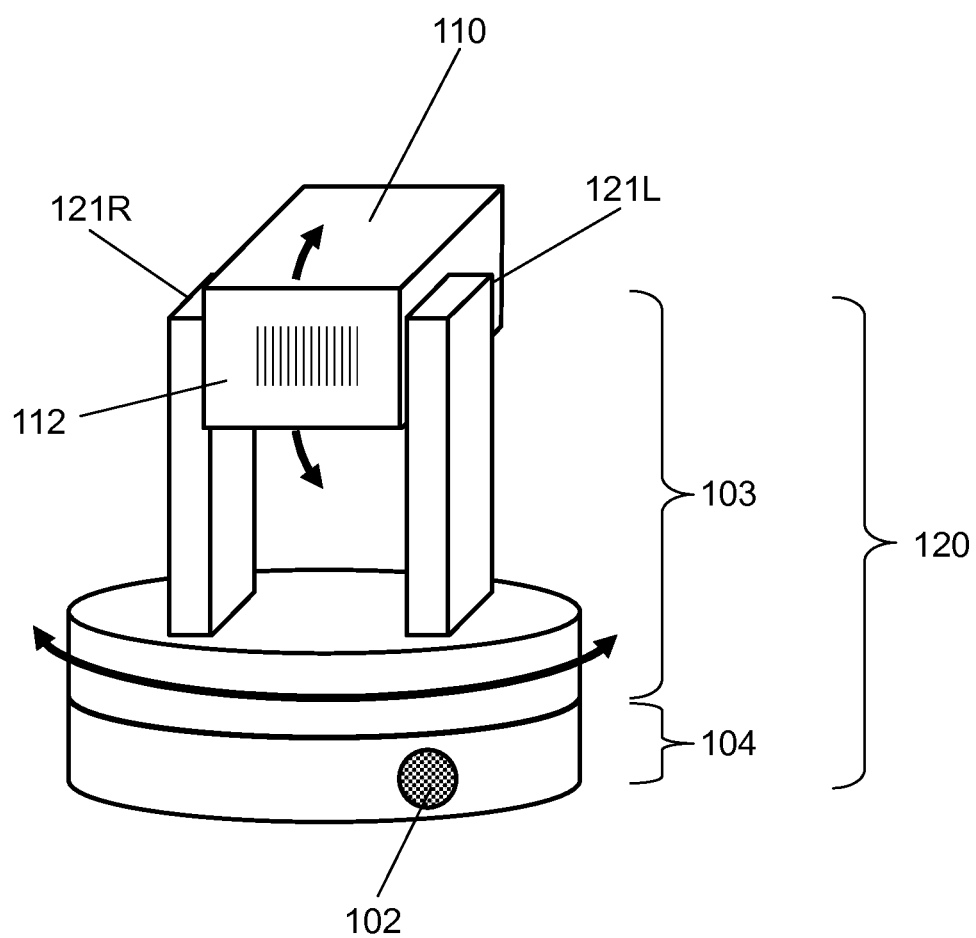
FIG. 2 is a perspective view from the rear and top left of the projector apparatus in accordance with the first exemplary embodiment.

FIG. 1 is a perspective view from the front and top right of projector apparatus 100 in accordance with the first exemplary embodiment. FIG. 2 is a perspective view from the rear and top left of projector apparatus 100 in accordance with the first exemplary embodiment.

As shown in FIG. 1 and FIG. 2, projector apparatus 100 includes projector 110 and projector support table 120.

Projector support table 120 includes turning unit 103 and fixed unit 104.

Turning unit 103 includes a pair of projector support units 121L and 121R for turnably supporting projector 110.

Fixed unit 104 includes intake port 101 and exhaust port 102, and turnably supports turning unit 103.

Projector 110 converts a video signal input from the outside into video light, and projects the video light toward a screen (not shown). Video corresponding to the video signal is displayed on the screen on which the video light is projected. The video light is projected from video projection unit 105 disposed on front surface 111 of projector 110. The functions of projector 110 and the configuration for achieving these functions are substantially the same as those of a typically used projector, so that detailed descriptions are omitted.

In projector apparatus 100, projector 110 is turnably supported by the pair of projector support units 121L and 121R. Therefore, a user (not shown) can vertically and optionally adjust the projection direction of the video light projected from projector 110. In projector apparatus 100, turning unit 103 is turnably supported by fixed unit 104. Therefore, projector 110 supported by projector support units 121L and 121R also turns in response to the movement of turning unit 103. Therefore, the user can laterally and optionally adjust the projection direction of the video light projected from projector 110. In other words, the user who uses projector apparatus 100 can set, at any direction, the projection direction of the video light projected from projector 110 by combining the vertical and lateral movements.

Here, the lateral direction indicates the horizontal direction to the installation surface on which projector support table 120 is installed. The vertical direction indicates the perpendicular direction to the installation surface.

Projector support table 120 is configured to take the external air from intake port 101 and discharge the air from exhaust port 102 to the outside. Hereinafter, the taken air is referred to as "intake air". The intake air taken from intake port 101 is taken into projector 110 through inside of projector support table 120, and is used for cooling projector 110. The air heated by the use for cooling is discharged from projector 110. Hereinafter, the discharged air is referred to as "exhaust air". The exhaust air discharged from projector 110 passes through inside of projector support table 120, and is discharged from exhaust port 102. The details of the structures are described later.

In projector apparatus 100, thus, the air used for cooling projector 110 is taken from intake port 101 that is disposed in fixed unit 104 of projector support table 120, and the exhaust air discharged from projector 110 is discharged from exhaust port 102 that is disposed in fixed unit 104.

In projector apparatus 100, even when turning unit 103 is turned with respect to the installation surface of projector support table 120, fixed unit 104 remains at rest with respect to the installation surface. Therefore, even when turning unit 103 is turned, the positions of intake port 101 and exhaust port 102 do not change with respect to the installation surface, and the intake direction of intake port 101 and the exhaust direction of exhaust port 102 do not change either.

In projector support table 120, in order to prevent the exhaust air discharged from exhaust port 102 from being taken into intake port 101, preferably, intake port 101 and exhaust port 102 are disposed at positions different from each other. Specifically, preferably, the intake direction of intake port 101 and the exhaust direction of exhaust port 102 are set opposite to each other or set on the skew. FIG. 1 and FIG. 2 show the example where intake port 101 and exhaust port 102 are disposed at the opposite positions on fixed unit 104. In the present exemplary embodiment, the installation positions of intake port 101 and exhaust port 102 are not limited to this example.

Next, projector 110 is described.

FIG. 3A is a front view of projector 110 in accordance with the first exemplary embodiment. FIG. 3B is a rear view of projector 110 in accordance with the first exemplary embodiment. FIG. 3C is a right side view of projector 110 in accordance with the first exemplary embodiment. FIG. 3D is a left side view of projector 110 in accordance with the first exemplary embodiment.

FIG. 4A is a right side view of projector apparatus 100 in accordance with the first exemplary embodiment. FIG. 4B is a left side view of projector apparatus 100 in accordance with the first exemplary embodiment.

As shown in FIG. 3A to FIG. 3D, projector 110 includes, on front surface 111, video projection unit 105 having a lens used for projecting video light. Projector 110 includes mounting unit 113R on its right surface when projector 110 is viewed from the front, and includes mounting unit 113L on its left surface. Projector 110 may include a video signal input terminal or computer connection terminal on rear surface 112 or the like.

Mounting units 113L and 113R have a cylindrically projecting shape, and are formed so as to engage with mounting holes (not shown) disposed in projector support units 121L and 121R, respectively. As shown in FIG. 4A and FIG. 4B, projector 110 whose mounting units 113L and 113R are attached to the mounting holes turns vertically about mounting units 113L and 113R serving as a turning axis.

As shown in FIG. 3C and FIG. 3D, projector 110 includes intake hole 114 in mounting unit 113R and includes exhaust hole 115 in mounting unit 113L.

In projector 110, a hollow part in cylindrically formed mounting unit 113R is used as intake hole 114 as shown in FIG. 3C. Projector 110 is configured to take the air (intake air) for cooling from intake hole 114.

In projector 110, a hollow part in cylindrically formed mounting unit 113L is used as exhaust hole 115 as shown in FIG. 3D. Projector 110 is configured to discharge the air (exhaust air) having been used for cooling from exhaust hole 115.

The internal structure for air cooling of projector 110 is substantially the same as that of a typically used projector except that intake hole 114 is formed in mounting unit 113R and exhaust hole 115 is formed in mounting unit 113L. Therefore, the descriptions of the internal structure of projector 110 are omitted.

[1-2. Internal Structure of Projector Support Table]

Next, the internal structure of projector support table 120 is described.

Figure 5B:
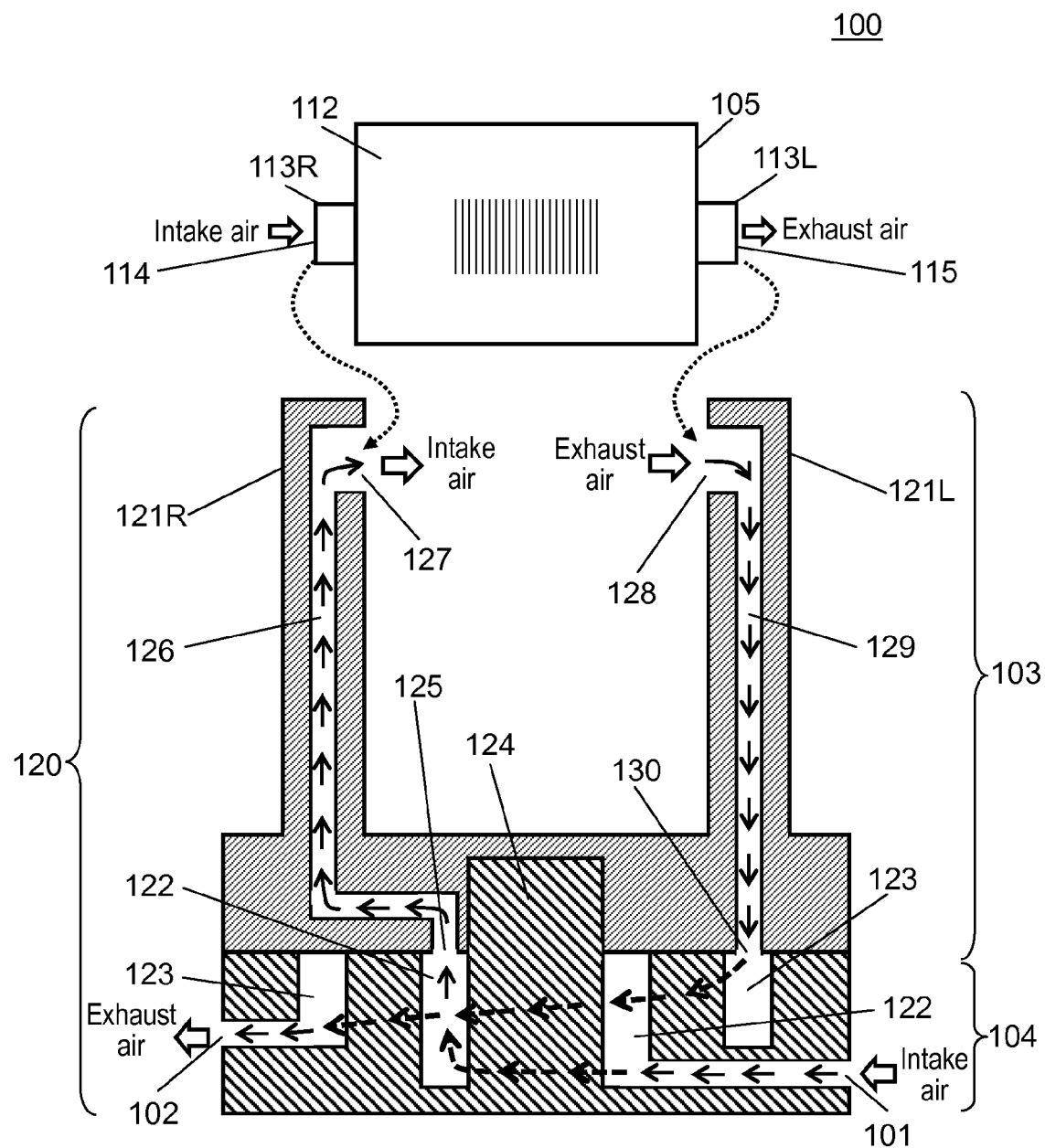
FIG. 5B is another sectional view of the projector support table in accordance with the first exemplary embodiment.

FIG. 5A and FIG. 5B are sectional views of projector support table 120 in accordance with the first exemplary embodiment. FIG. 5A is a sectional view taken along line A-A in FIG. 4A and FIG. 4B.

FIG. 6A and FIG. 6B are exploded perspective views showing the internal structure of projector support table 120 in accordance with the first exemplary embodiment.

FIG. 5A and FIG. 6A show projector support table 120 when turning unit 103 is turned so that intake port 101 is located immediately below projector support unit 121R and exhaust port 102 is located immediately below projector support unit 121L.

FIG. 5B and FIG. 6B show projector support table 120 when turning unit 103 is rotated a half turn)(180° from the state shown by FIG. 5A and FIG. 6A.

In FIG. 5A, FIG. 5B, FIG. 6A, and FIG. 6B, the flows of air are shown by arrows.

As shown in each drawing, fixed unit 104 includes intake port 101, first intake passage 122, second exhaust passage 123, exhaust port 102, and turning shaft 124. Turning unit 103 includes projector support units 121L and 121R, intake air taking port 125, second intake passage 126, intake air discharging port 127, exhaust air taking port 128, first exhaust passage 129, exhaust air discharging port 130, and bearing 131.

Turning shaft 124 is formed in a cylindrically projecting shape at a substantially center position of fixed unit 104, for example, as shown in FIG. 6A. Bearing 131 is formed in a cylindrically recessed shape at a substantially center position of turning unit 103. Turning shaft 124 and bearing 131 are formed so as to engage with each other. By engaging turning shaft 124 with bearing 131, turning unit 103 is turnably supported by fixed unit 104.

First intake passage 122 is formed around turning shaft 124 in a groove shape whose upper part is open, and is connected to intake port 101, as shown in FIG. 6A and FIG. 6B.

Turning unit 103 is configured so that, when turning unit 103 is mounted to fixed unit 104, intake air taking port 125 is located on first intake passage 122 (FIG. 6A and FIG. 6B) and turning unit 103 except intake air taking port 125 blocks the upper part (open part) of first intake passage 122 (FIG. 5A and FIG. 5B). Turning unit 103 is configured so that, when turning unit 103 is turned on fixed unit 104, intake air taking port 125 slides on first intake passage 122 along first intake passage 122 (FIG. 6A and FIG. 6B).

Intake air discharging port 127 is located in an upper part of projector support unit 121R and is formed so as to engage with mounting unit 113R of projector 110 (FIG. 5A and FIG. 5B). In other words, intake air discharging port 127 substantially serves as a mounting hole to which mounting unit 113R of projector 110 is attached. This can translate into the expression where the mounting hole is integrated with intake air discharging port 127 in projector support unit 121R.

Intake air taking port 125 is connected to intake air discharging port 127 via second intake passage 126 that is formed so as to penetrate projector support unit 121R (FIG. 5A to FIG. 6B).

In projector support table 120 of the present exemplary embodiment, turning unit 103 and fixed unit 104 have such structures. Thus, the intake air taken from intake port 101 passes through first intake passage 122, then is taken from intake air taking port 125, passes through second intake passage 126, and is discharged from intake air discharging port 127. The intake air thus discharged from intake air discharging port 127 is taken into projector 110 from intake hole 114 of projector 110, and is used for cooling projector 110.

In projector support table 120, when turning unit 103 is turned, intake air taking port 125 slides on first intake passage 122. Therefore, even when turning unit 103 is turned, intake air taking port 125 can always take the intake air from first intake passage 122. At this time, the position of intake port 101 remains at rest with respect to the installation surface of projector support table 120.

In the conventional technology, there can be the problem that, when the user turns the projector, the intake port accidentally points to an external heat generation source and the air heated by the heat generation source is taken from the intake port. In projector support table 120, however, intake port 101 does not move from the initial installation position even when the user turns projector 110, as discussed above. Therefore, the occurrence of such a problem can be prevented.

Second exhaust passage 123 is formed in a groove shape having an open upper part in the outer periphery of first intake passage 122, and is connected to exhaust port 102, as shown in FIG. 6A and FIG. 6B.

Turning unit 103 is configured so that, when turning unit 103 is mounted to fixed unit 104, exhaust air discharging port 130 is located on second exhaust passage 123 (FIG. 6A and FIG. 6B) and turning unit 103 except exhaust air discharging port 130 blocks the upper part of second exhaust passage 123 (FIG. 5A and FIG. 5B). Turning unit 103 is configured so that, when turning unit 103 is turned on fixed unit 104, exhaust air discharging port 130 slides on second exhaust passage 123 along second exhaust passage 123 (FIG. 6A and FIG. 6B).

Exhaust air taking port 128 is located in an upper part of projector support unit 121L and is formed so as to engage with mounting unit 113L of projector 110 (FIG. 5A and FIG. 5B). In other words, exhaust air taking port 128 substantially serves as a mounting hole to which mounting unit 113L of projector 110 is attached. This can translate into the expression where the mounting hole is integrated with exhaust air taking port 128 in projector support unit 121L.

Exhaust air taking port 128 is connected to exhaust air discharging port 130 via first exhaust passage 129 that is formed so as to penetrate projector support unit 121L (FIG. 5A to FIG. 6B).

In projector support table 120 of the present exemplary embodiment, turning unit 103 and fixed unit 104 have such structures. Thus, the exhaust air discharged from exhaust hole 115 of projector 110 is taken from exhaust air taking port 128, passes through first exhaust passage 129, and then is discharged from exhaust air discharging port 130 to second exhaust passage 123. The exhaust air passes through second exhaust passage 123, and then is discharged from exhaust port 102 to the outside. The exhaust air discharged from projector 110 is thus discharged from exhaust port 102.

In projector support table 120, when turning unit 103 is turned, exhaust air discharging port 130 slides on second exhaust passage 123. Therefore, even when turning unit 103 is turned, exhaust air discharging port 130 can always discharge the exhaust air to second exhaust passage 123. At this time, the position of exhaust port 102 remains at rest with respect to the installation surface of projector support table 120. Therefore, projector support table 120 can prevent the occurrence of the problem that, when the user turns projector 110, the exhaust air discharged from exhaust port 102 is accidentally taken from intake port 101.

[1-3. Effect or the Like]

Thus, in the present exemplary embodiment, the projector apparatus includes a projector having a mounting unit, and a projector support table for supporting the projector at the mounting unit.

The projector support table includes a turning unit and a fixed unit. The turning unit includes a projector support unit to which the mounting unit of the projector can be attached. The fixed unit includes an intake port, and turnably supports the turning unit. The fixed unit also includes a first intake passage through which the intake air taken from the intake port passes. The turning unit also includes an intake air taking port for taking the intake air having passed through the first intake passage, a second intake passage through which the intake air taken from the intake air taking port passes, and an intake air discharging port for discharging, to the intake hole of the projector, the intake air having passed through the second intake passage.

In the projector support table, when the turning unit is turned with respect to the fixed unit, the intake air taking port may slide on the first intake passage.

In the projector, the mounting unit may be integrated with the intake hole. In the projector support table, the projector support unit of the turning unit may be integrated with the intake air discharging port thereof.

In the projector support table, the projector support unit may turnably support the projector.

In the projector support table, the turning unit may include an exhaust air taking port for taking the exhaust air discharged from the exhaust hole of the projector, a first exhaust passage through which the exhaust air taken from the exhaust air taking port passes, and an exhaust air discharging port for discharging the exhaust air having passed through the first exhaust passage. The fixed unit may include a second exhaust passage through which the exhaust air discharged from the exhaust air discharging port passes, and an exhaust port for discharging the exhaust air having passed through the second exhaust passage.

In the projector support table, when the turning unit is turned with respect to the fixed unit, the exhaust air discharging port may slide on the second exhaust passage.

The projector may have the structure where the projector has a pair of mounting units, one of the pair of mounting units is integrated with the intake hole, and the other of the pair of mounting units is integrated with the exhaust hole. The projector support table may have the structure where the turning unit has a pair of projector support units, one of the pair of projector support units is integrated with the intake air discharging port, and the other of the pair of projector support units is integrated with the exhaust air taking port.

In the conventional technology, there can be the problem that, when the user turns the projector, the intake port accidentally points to an external heat generation source and the air heated by the heat generation source is taken from the intake port. In projector support table 120, however, intake port 101 does not move from the initial installation position even when the user turns projector 110, as discussed above. Thus, such a problem can be prevented from occurring.

In the present exemplary embodiment, projector apparatus 100 is one example of the projector apparatus. Projector 110 is one example of the projector. Projector support table 120 is one example of the projector support table. Turning unit 103 is one example of the turning unit. Fixed unit 104 is one example of the fixed unit. Intake port 101 is one example of the intake port. First intake passage 122 is one example of the first intake passage. Intake air taking port 125 is one example of the intake air taking port. Second intake passage 126 is one example of the second intake passage. Intake air discharging port 127 is one example of the intake air discharging port. Each of projector support units 121L and 121R is one example of the projector support unit. Each of mounting units 113L and 113R is one example of the mounting unit. Intake hole 114 is one example of the intake hole. Exhaust hole 115 is one example of the exhaust hole. Exhaust air taking port 128 is one example of the exhaust air taking port. First exhaust passage 129 is one example of the first exhaust passage. Exhaust air discharging port 130 is one example of the exhaust air discharging port. Second exhaust passage 123 is one example of the second exhaust passage. Exhaust port 102 is one example of the exhaust port.

Second Exemplary Embodiment

The first exemplary embodiment has described the structure where projector support table 120 includes exhaust port 102. When a projector includes an exhaust port, however, the projector support table does not need to include an exhaust port. In the second exemplary embodiment, a structure is described where the projector support table does not include an exhaust port.

Hereinafter, the second exemplary embodiment is described with reference to FIG. 7 to FIG. 11.

[2-1. Configuration]

Figure 7:
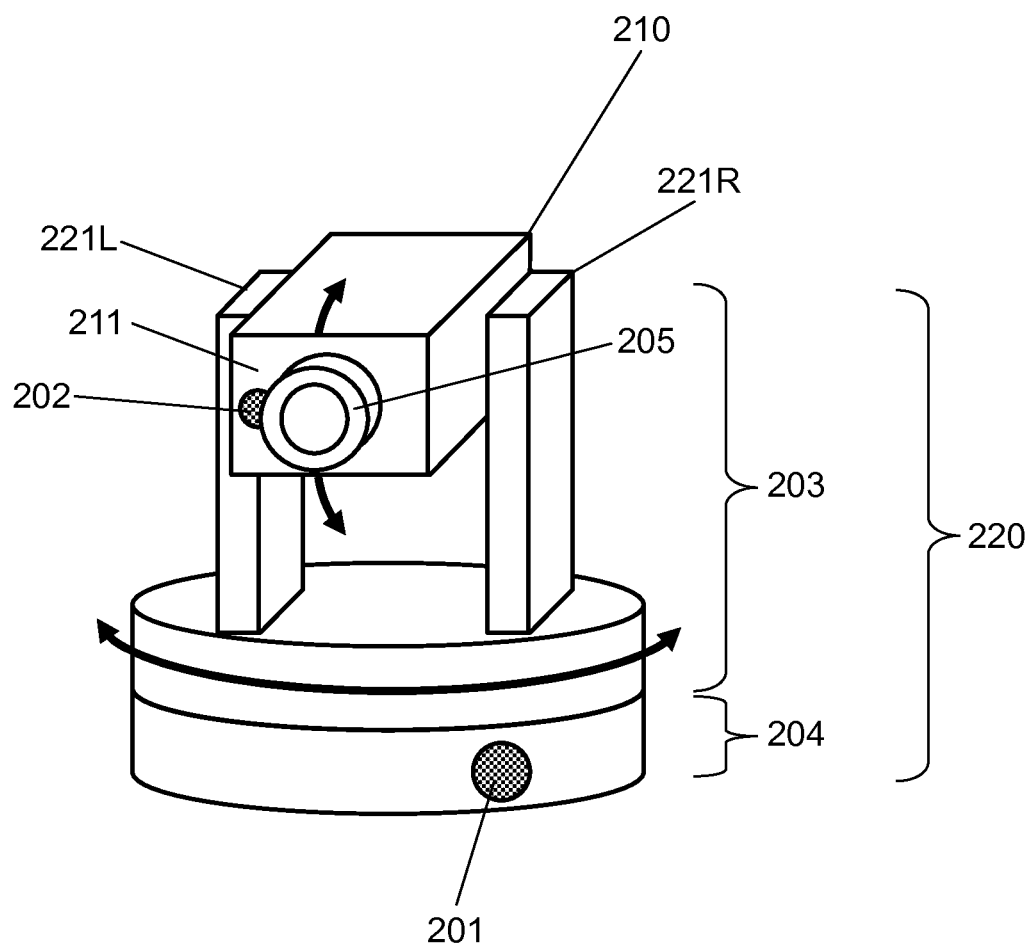
FIG. 7 is a perspective view from the front and top right of a projector apparatus in accordance with a second exemplary embodiment.

FIG. 7 is a perspective view from the front and top right of projector apparatus 200 in accordance with the second exemplary embodiment.

As shown in FIG. 7, projector apparatus 200 includes projector 210 and projector support table 220.

Projector support table 220 includes turning unit 203 and fixed unit 204.

Turning unit 203 includes a pair of projector support units 221L and 221R for turnably supporting projector 210.

Fixed unit 204 includes intake port 201, and turnably supports turning unit 203.

Figure 8B:
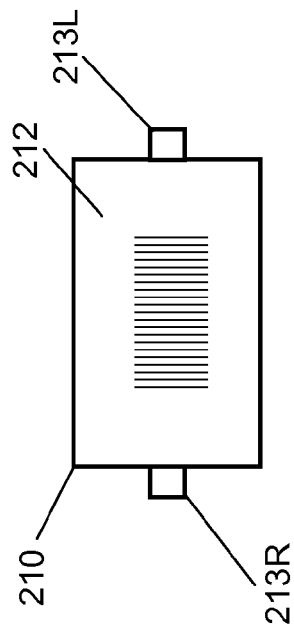
FIG. 8B is a rear view of the projector in accordance with the second exemplary embodiment.
Figure 8A:
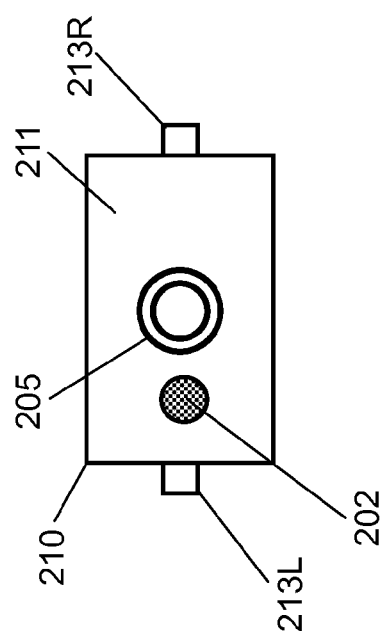
FIG. 8A is a front view of a projector in accordance with the second exemplary embodiment.
Figure 8D:
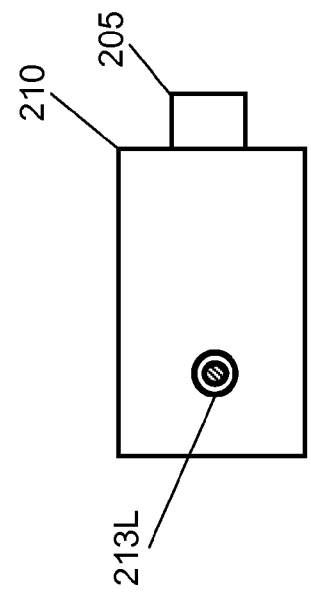
FIG. 8D is a left side view of the projector in accordance with the second exemplary embodiment.
Figure 8C:
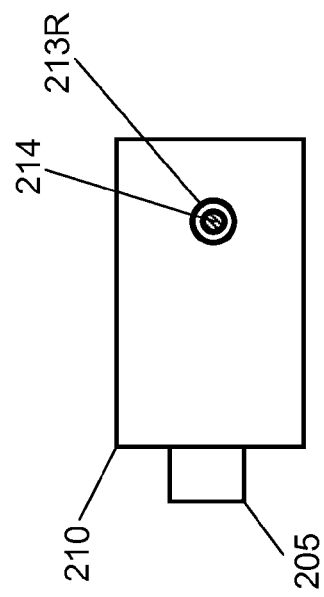
FIG. 8C is a right side view of the projector in accordance with the second exemplary embodiment.

FIG. 8A is a front view of projector 210 in accordance with the second exemplary embodiment. FIG. 8B is a rear view of projector 210 in accordance with the second exemplary embodiment. FIG. 8C is a right side view of projector 210 in accordance with the second exemplary embodiment. FIG. 8D is a left side view of projector 210 in accordance with the second exemplary embodiment.

Figure 9:
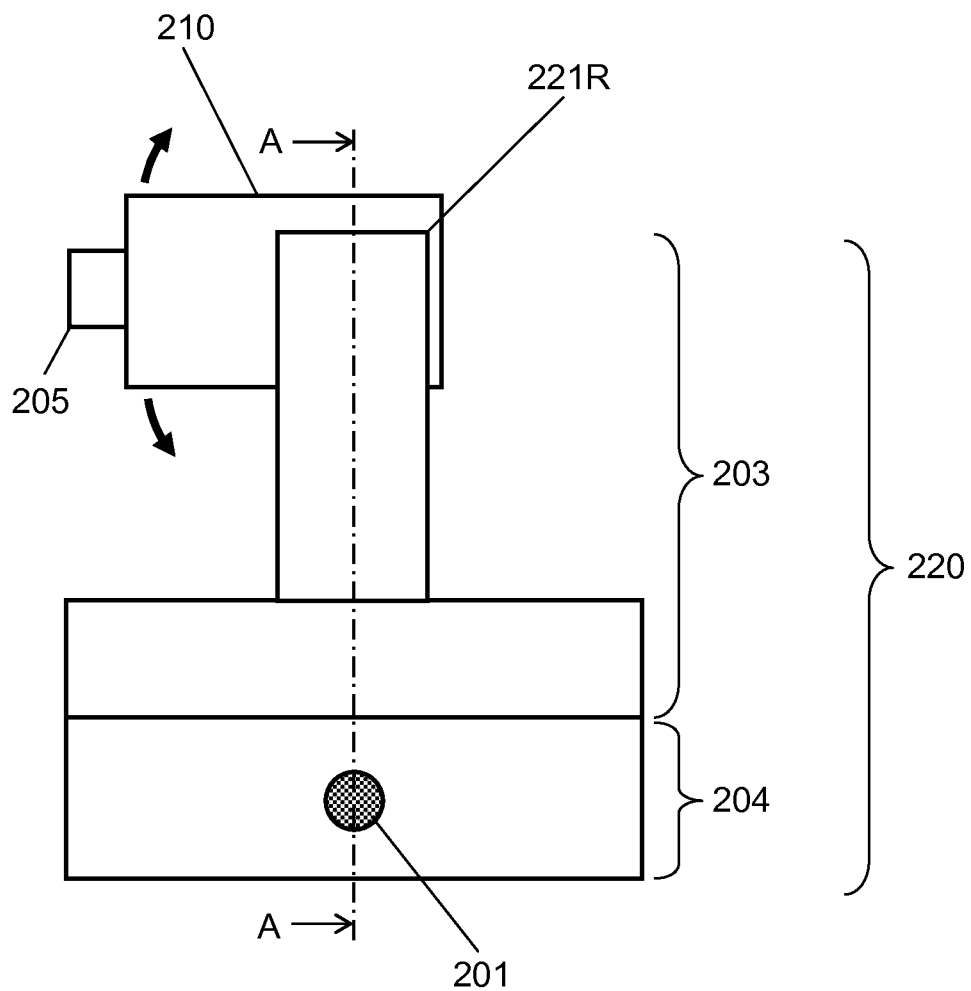
FIG. 9 is a right side view of the projector apparatus in accordance with the second exemplary embodiment.

FIG. 9 is a right side view of projector apparatus 200 in accordance with the second exemplary embodiment.

As shown in FIG. 8A to FIG. 8D, projector 210 includes video projection unit 205 and exhaust port 202 on front surface 211. Projector 210 includes mounting unit 213R on its right surface when projector 210 is viewed from the front, and includes mounting unit 213L on its left surface. Mounting unit 213R includes intake hole 214. Projector 210 may include a video signal input terminal or computer connection terminal on rear surface 212 or the like.

Projector 210 is substantially the same as projector 110 described in the first exemplary embodiment except that exhaust port 202 for discharging the exhaust air to the outside is disposed in front surface 211. Therefore, detailed descriptions of projector 210 are omitted.

Exhaust port 202 may be disposed in a part other than front surface 211,—for example, rear surface 212.

[2-2. Internal Structure of Projector Support Table]

Next, the internal structure of projector support table 220 is described.

Figure 10A:
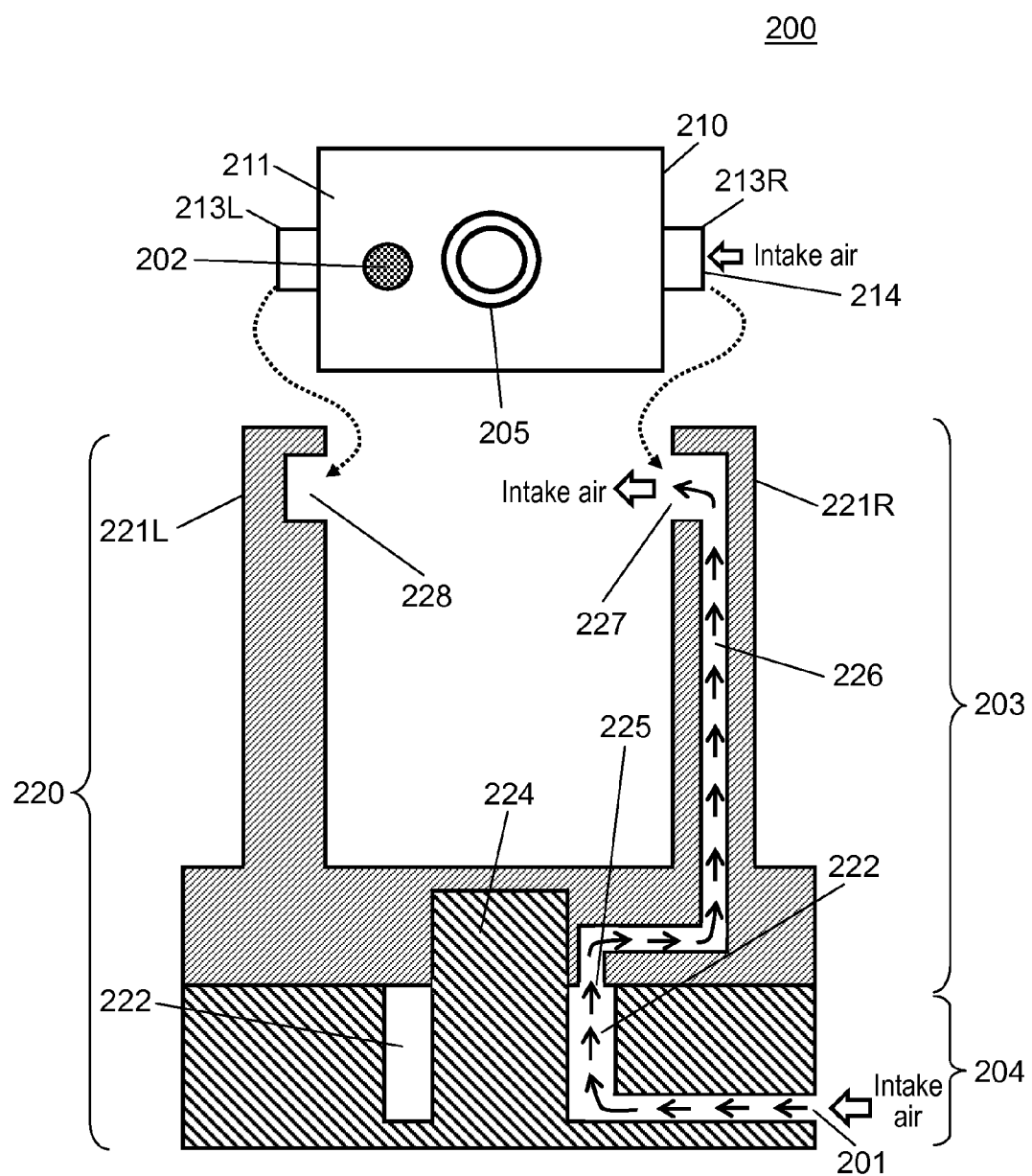
FIG. 10A is a sectional view of a projector support table in accordance with the second exemplary embodiment.
Figure 10B:
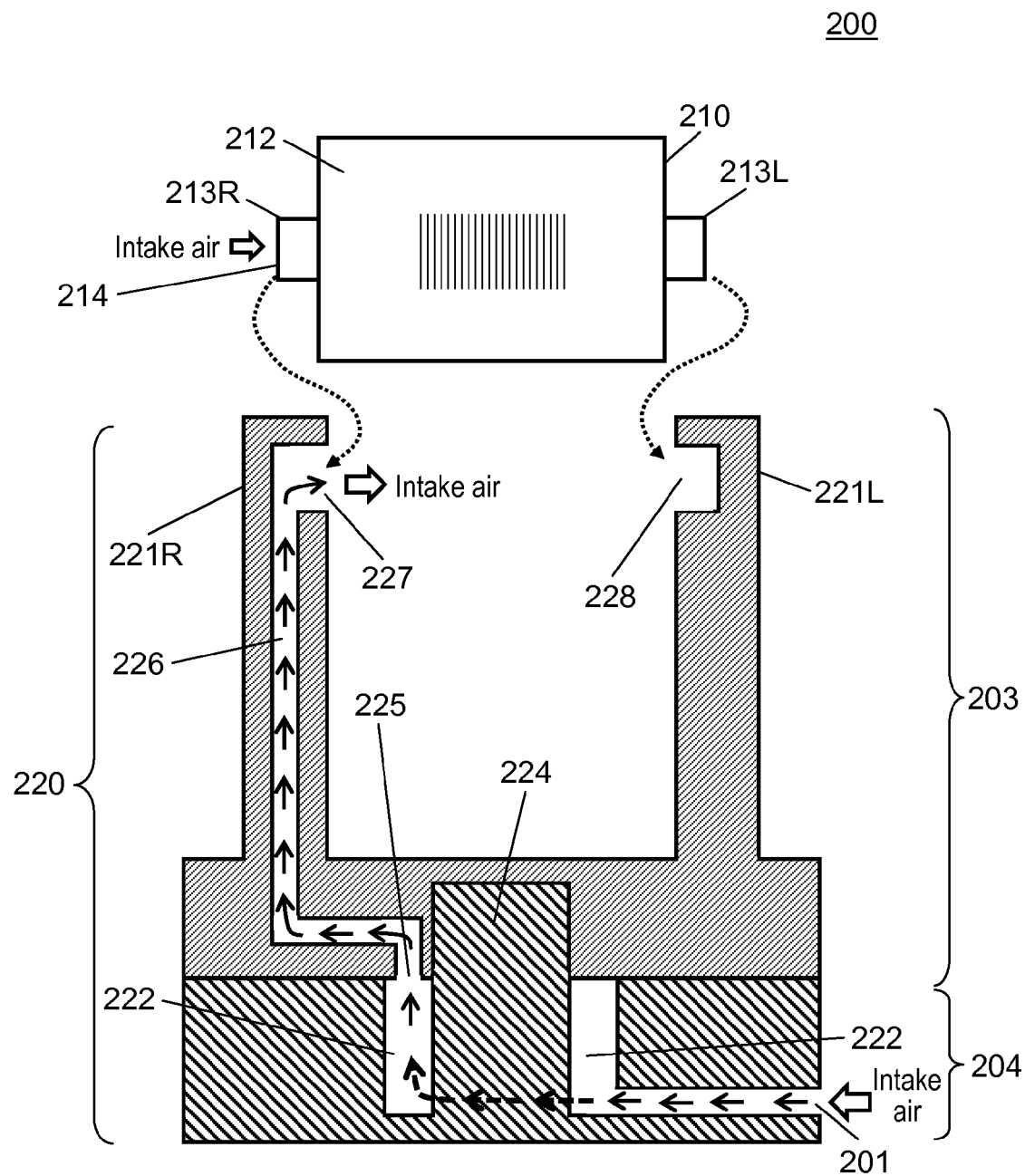
FIG. 10B is another sectional view of the projector support table in accordance with the second exemplary embodiment.

FIG. 10A and FIG. 10B are sectional views of projector support table 220 in accordance with the second exemplary embodiment. FIG. 10A is a sectional view taken along line A-A in FIG. 9.

FIG. 11 is an exploded perspective view showing the internal structure of projector support table 220 in accordance with the second exemplary embodiment.

FIG. 10A shows the sectional view of projector support table 220 when turning unit 203 is turned so that intake port 201 is located immediately below projector support unit 221R.

FIG. 10B shows the sectional view of projector support table 220 when turning unit 203 is rotated a half turn (180°) from the state shown by FIG. 10A.

In FIG. 10A, FIG. 10B, and FIG. 11, the flow of air is shown by arrows.

As shown in each drawing, fixed unit 204 includes intake port 201, first intake passage 222, and turning shaft 224. Turning unit 203 includes projector support units 221L and 221R, intake air taking port 225, second intake passage 226, intake air discharging port 227, mounting hole 228, and bearing 231.

Fixed unit 204 includes no second exhaust passage and no exhaust port, differently from fixed unit 104 shown in the first exemplary embodiment. However, fixed unit 204 is substantially the same as fixed unit 104 except for this point. Therefore, detailed descriptions of fixed unit 204 are omitted.

Turning unit 203 includes no exhaust air taking port, no first exhaust passage, and no exhaust air discharging port, differently from turning unit 103 shown in the first exemplary embodiment. Instead of the exhaust air taking port, mounting hole 228 formed so as to engage with mounting unit 213L of the projector is disposed in projector support unit 221L. Turning unit 203 is substantially the same as turning unit 103 except for this point, so that detailed descriptions of turning unit 203 are omitted.

In projector support table 220 having such a structure, when turning unit 203 is turned, intake air taking port 225 slides on first intake passage 222. This behavior is similar to that in projector support table 120 of the first exemplary embodiment. Therefore, even when turning unit 203 is turned, intake air taking port 225 can always take intake air from first intake passage 222. At this time, the position of intake port 201 remains at rest with respect to the installation surface of projector support table 220.

Therefore, similarly to the first exemplary embodiment, projector support table 220 can also prevent the occurrence of the problem that, when the user turns the projector, the intake port accidentally points to an external heat generation source and the air heated by the heat generation source is taken from the intake port.

[2-3. Effect or the Like]

Thus, in the present exemplary embodiment, the projector apparatus includes a projector having a mounting unit, and a projector support table for supporting the projector at the mounting unit.

The projector support table includes a turning unit and a fixed unit. The turning unit includes a projector support unit to which the mounting unit of the projector can be attached. The fixed unit includes an intake port, and turnably supports the turning unit. The fixed unit also includes a first intake passage through which the intake air taken from the intake port passes. The turning unit also includes an intake air taking port for taking the intake air having passed through the first intake passage, a second intake passage through which the intake air taken from the intake air taking port passes, and an intake air discharging port for discharging, to the intake hole of the projector, the intake air having passed through the second intake passage.

In projector support table 220, thus, intake port 201 does not move from the initial installation position even when the user turns projector 210. Therefore, projector support table 220 can prevent the occurrence of the problem that, when the user turns the projector, the intake port accidentally points to an external heat generation source and the air heated by the heat generation source is taken from the intake port.

In the present exemplary embodiment, projector apparatus 200 is one example of the projector apparatus. Projector 210 is one example of the projector. Projector support table 220 is one example of the projector support table. Turning unit 203 is one example of the turning unit. Fixed unit 204 is one example of the fixed unit. Intake port 201 is one example of the intake port. First intake passage 222 is one example of the first intake passage. Intake air taking port 225 is one example of the intake air taking port. Second intake passage 226 is one example of the second intake passage. Intake air discharging port 227 is one example of the intake air discharging port. Each of projector support units 221L and 221R is one example of the projector support unit. Each of mounting units 213L and 213R is one example of the mounting unit. Intake hole 214 is one example of the intake hole.

Third Exemplary Embodiment

The first and second exemplary embodiments have described the structure where an intake port is disposed in a side surface of a fixed unit. However, the installation position of the intake port is not limited to the side surface of the fixed unit. In the third exemplary embodiment, a structure is described where an intake port is disposed in a part other than the side surface of the fixed unit.

The third exemplary embodiment describes a structure where a projector includes an exhaust port and a projector support table includes no exhaust port, similarly to the second exemplary embodiment.

Hereinafter, the third exemplary embodiment is described with reference to FIG. 12 to FIG. 15.

[3-1. Configuration]

Figure 12:
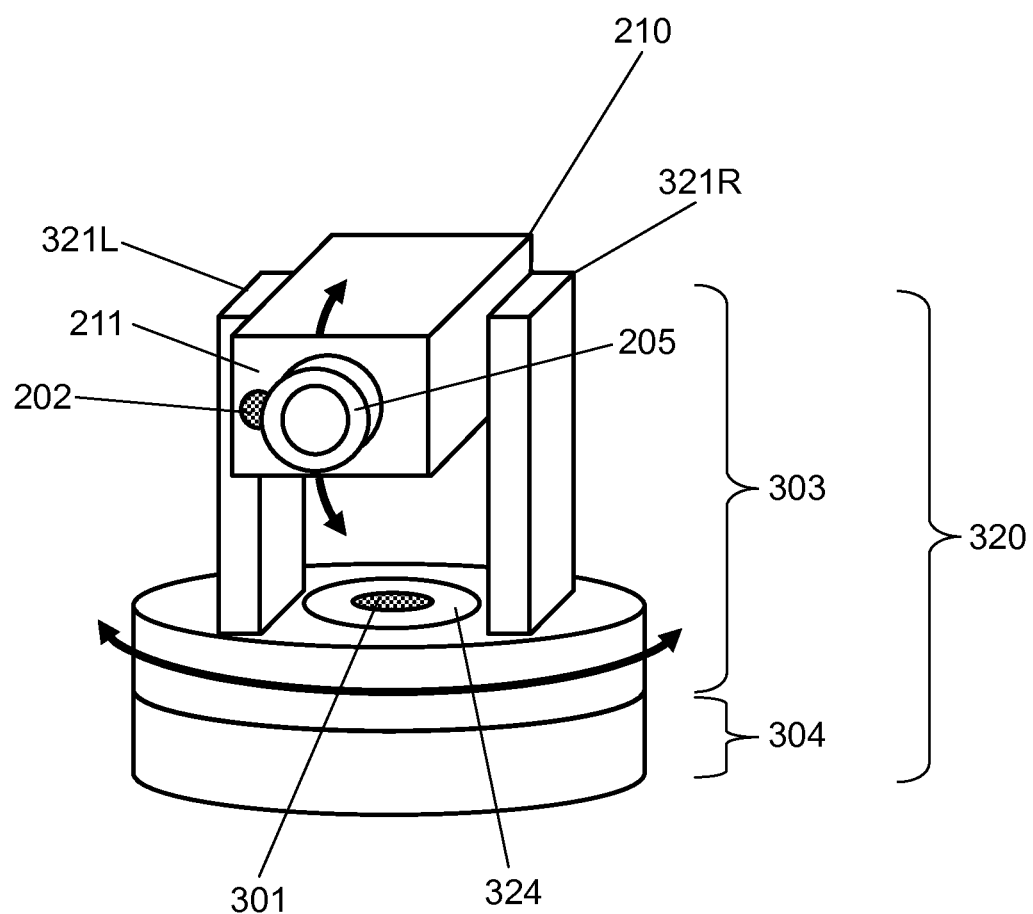
FIG. 12 is a perspective view from the front and top right of a projector apparatus in accordance with a third exemplary embodiment.

FIG. 12 is a perspective view from the front and top right of projector apparatus 300 in accordance with the third exemplary embodiment.

As shown in FIG. 12, projector apparatus 300 includes projector 210 and projector support table 320.

Projector 210 is substantially the same as projector 210 of the second exemplary embodiment, so that the descriptions of projector 210 are omitted.

Projector support table 320 includes turning unit 303 and fixed unit 304.

Turning unit 303 includes a pair of projector support units 321L and 321R for turnably supporting projector 210.

Fixed unit 304 includes turning shaft 324 and intake port 301, and turnably supports turning unit 303. In the present exemplary embodiment, turning shaft 324 includes intake port 301, differently from the first and second exemplary embodiments.

[3-2. Internal Structure of Projector Support Table]

Next, the internal structure of projector support table 320 is described.

Figure 13:
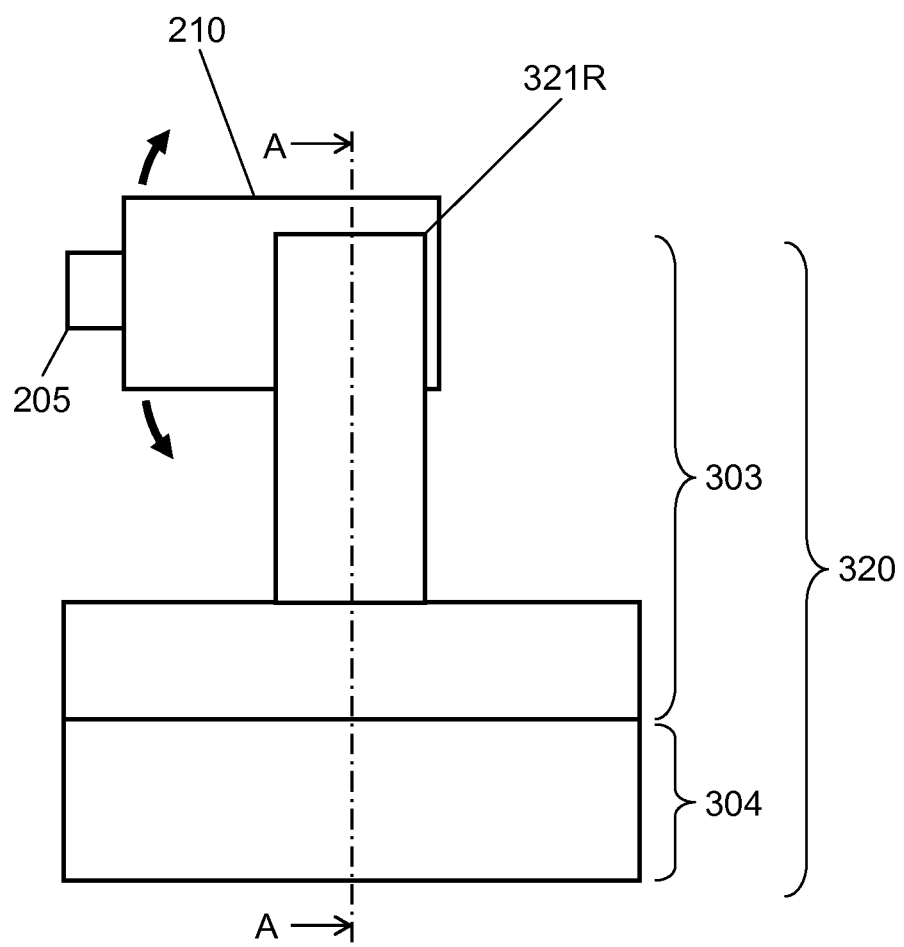
FIG. 13 is a right side view of the projector apparatus in accordance with the third exemplary embodiment.

FIG. 13 is a right side view of projector apparatus 300 in accordance with the third exemplary embodiment.

Figure 14A:
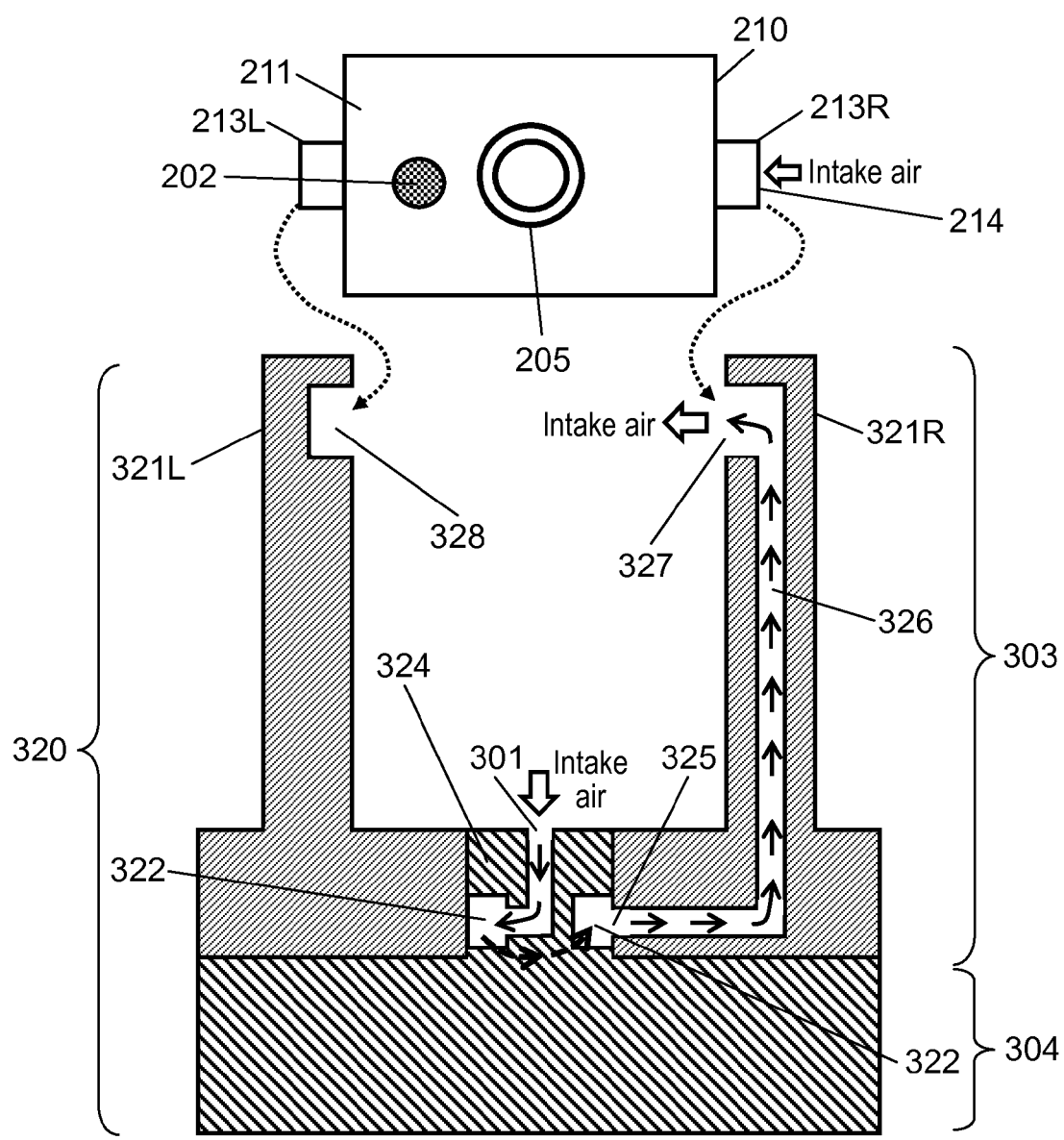
FIG. 14A is a sectional view of a projector support table in accordance with the third exemplary embodiment.
Figure 14B:
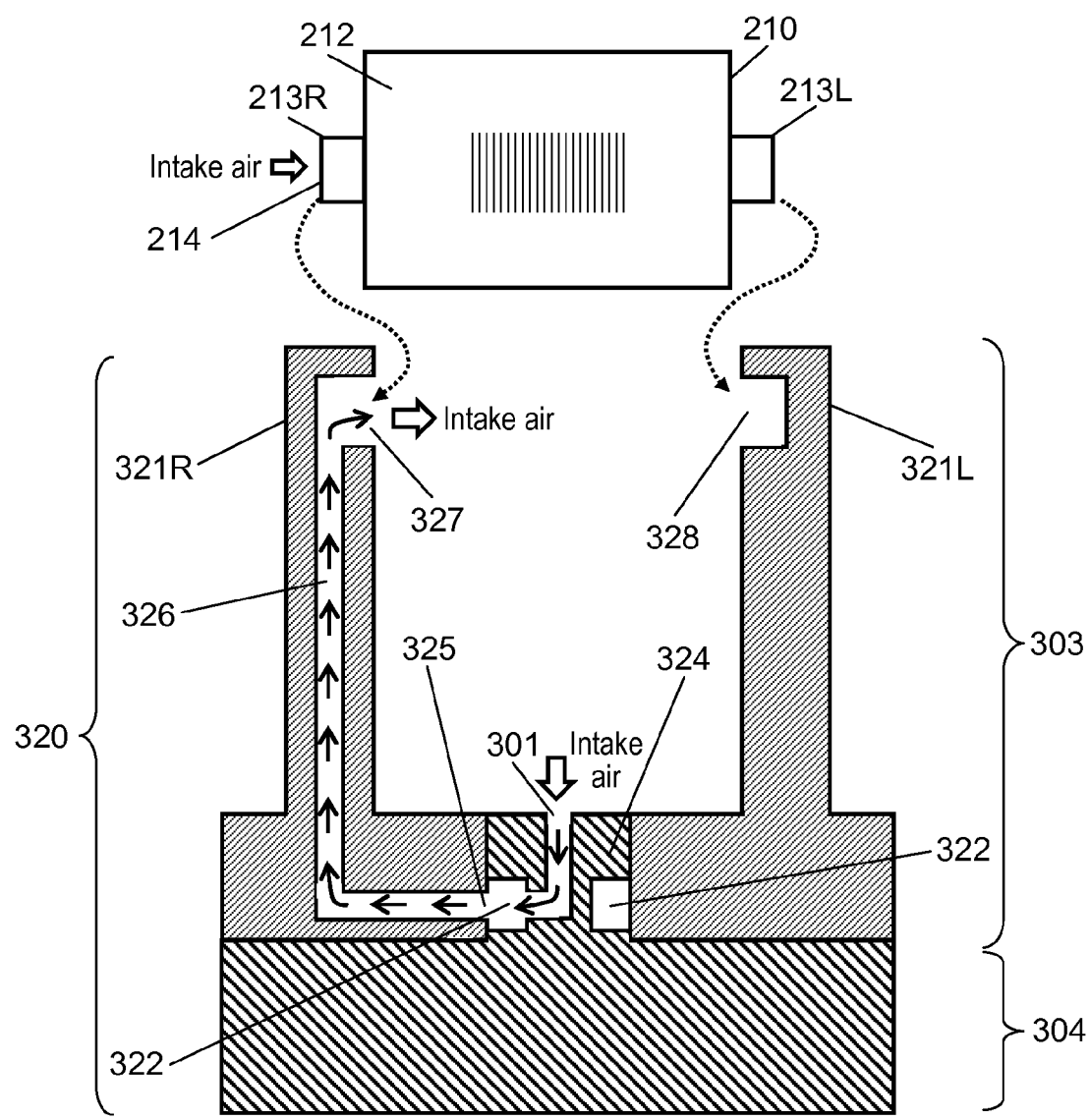
FIG. 14B is another sectional view of the projector support table in accordance with the third exemplary embodiment.

FIG. 14A and FIG. 14B are sectional views of projector support table 320 in accordance with the third exemplary embodiment. FIG. 14A is a sectional view taken along line A-A in FIG. 13. FIG. 14B shows the sectional view of projector support table 320 when turning unit 303 is rotated a half turn (180°) from the state shown by FIG. 14A.

Figure 15:
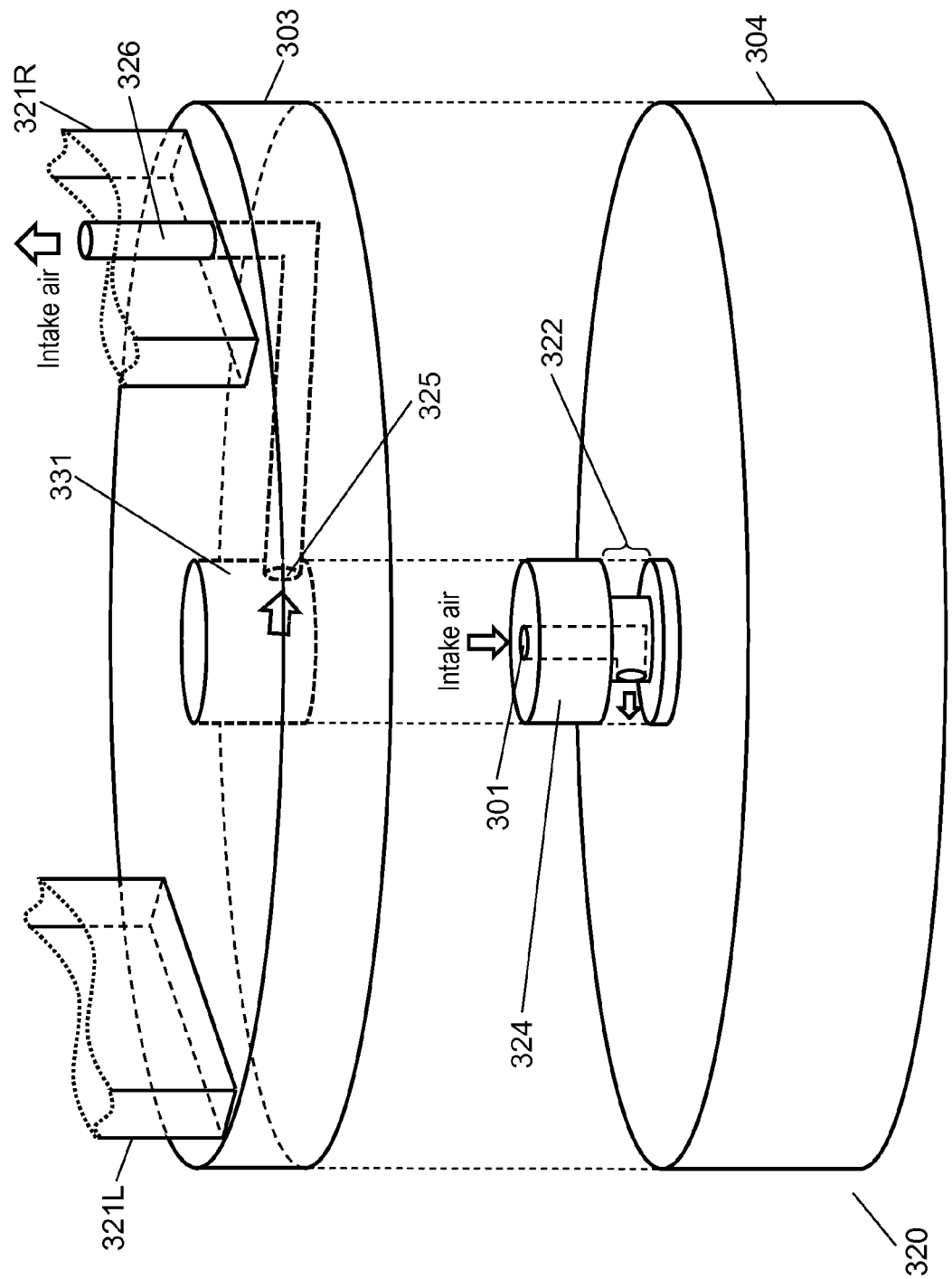
FIG. 15 is an exploded perspective view showing an internal structure of the projector support table in accordance with the third exemplary embodiment.

FIG. 15 is an exploded perspective view showing the internal structure of projector support table 320 in accordance with the third exemplary embodiment.

In FIG. 14A, FIG. 14B, and FIG. 15, the flow of air is shown by arrows.

As shown in each drawing, fixed unit 304 includes intake port 301, first intake passage 322, and turning shaft 324. Turning unit 303 includes projector support units 321L and 321R, intake air taking port 325, second intake passage 326, intake air discharging port 327, mounting hole 328, and bearing 331.

Turning shaft 324 is formed in a cylindrically projecting shape at a substantially center position of fixed unit 304, for example, as shown in FIG. 15. Bearing 331 is formed at a substantially center position of turning unit 303. Turning shaft 324 and bearing 331 are formed so as to engage with each other. By engaging turning shaft 324 with bearing 331, turning unit 303 is turnably supported by fixed unit 304.

In projector support table 320, bearing 331 penetrates so that, when turning shaft 324 is engaged with bearing 331, the upper surface of turning shaft 324 is exposed to the outside. Intake port 301 is disposed in the exposed upper surface of turning shaft 324.

First intake passage 322 is formed in a groove shape in a side surface of turning shaft 324, and is connected to intake port 301, as shown in FIG. 15.

Turning unit 303 is configured so that, when turning unit 303 is mounted to fixed unit 304, intake air taking port 325 is located on first intake passage 322 (FIG. 14A, FIG. 14B, and FIG. 15) and turning unit 303 except intake air taking port 325 blocks the open part of first intake passage 322 (FIG. 14A and FIG. 14B). Turning unit 303 is configured so that, when turning unit 303 is turned on fixed unit 304, intake air taking port 325 slides on first intake passage 322 along first intake passage 322 (FIG. 14A, FIG. 14B, and FIG. 15).

Strictly speaking, a side part of first intake passage 322 of the present exemplary embodiment is open, intake air taking port 325 is formed so as to face the opening region, and intake air taking port 325 slides along the opening region when turning unit 303 is turned. However, in order to make the contents easy to understand, the present exemplary embodiment describes that intake air taking port 325 is located on first intake passage 322 and slides on first intake passage 322.

Intake air taking port 325 is connected to intake air discharging port 327 via second intake passage 326 that is formed so as to penetrate projector support unit 321R (FIG. 14A to FIG. 15).

In projector support table 320 of the present exemplary embodiment, turning unit 303 and fixed unit 304 have such structures. Thus, the intake air taken from intake port 301 passes through first intake passage 322, then is taken from intake air taking port 325, passes through second intake passage 326, and is discharged from intake air discharging port 327. The intake air thus discharged from intake air discharging port 327 is taken into projector 210 from intake hole 214 of projector 210, and is used for cooling projector 210.

In projector support table 320, when turning unit 303 is turned, intake air taking port 325 slides on first intake passage 322. Therefore, even when turning unit 303 is turned, intake air taking port 325 can always take the intake air from first intake passage 322. At this time, the position of intake port 301 remains at rest.

Therefore, similarly to the first and second exemplary embodiments, projector apparatus 300 can also prevent the occurrence of the problem that, when the user turns the projector, the intake port accidentally points to an external heat generation source and the air heated by the heat generation source is taken from the intake port.

In projector apparatus 300, the possibility that the situation where video projection unit 205 projects video light directly downward occurs is low, so that the possibility that the exhaust air discharged from exhaust port 202 that is disposed on front surface 211 is taken into intake port 301 is low.

[3-3. Effect or the Like]

Thus, in the present exemplary embodiment, the projector apparatus includes a projector having a mounting unit, and a projector support table for supporting the projector at the mounting unit.

The projector support table includes a turning unit and a fixed unit. The turning unit includes a projector support unit to which the mounting unit of the projector can be attached. The fixed unit includes an intake port, and turnably supports the turning unit. The fixed unit also includes a first intake passage through which the intake air taken from the intake port passes. The turning unit also includes an intake air taking port for taking the intake air having passed through the first intake passage, a second intake passage through which the intake air taken from the intake air taking port passes, and an intake air discharging port for discharging, to the intake hole of the projector, the intake air having passed through the second intake passage.

In projector support table 320, thus, intake port 301 does not move from the initial installation position even when the user turns projector 210. Therefore, projector support table 320 can prevent the occurrence of the problem that, when the user turns the projector, the intake port accidentally points to an external heat generation source and the air heated by the heat generation source is taken from the intake port.

In the present exemplary embodiment, projector apparatus 300 is one example of the projector apparatus. Projector support table 320 is one example of the projector support table. Turning unit 303 is one example of the turning unit. Fixed unit 304 is one example of the fixed unit. Intake port 301 is one example of the intake port. First intake passage 322 is one example of the first intake passage. Intake air taking port 325 is one example of the intake air taking port. Second intake passage 326 is one example of the second intake passage. Intake air discharging port 327 is one example of the intake air discharging port. Each of projector support units 321L and 321R is one example of the projector support unit.

Other Exemplary Embodiments

Thus, the first to third exemplary embodiments have been described as examples of a technology disclosed in the present application. However, the disclosed technology is not limited to the exemplary embodiments. The disclosed technology can be also applied to the exemplary embodiment having undergone change, replacement, addition, or omission. A new exemplary embodiment may be created by combining the components described in the first to third exemplary embodiments.

Another exemplary embodiment is described hereinafter.

In the first to third exemplary embodiments, a projector where the mounting unit is integrated with the intake hole has been described. In the first exemplary embodiment, a projector where the mounting unit is integrated with the exhaust hole has been described. In order to correspond to such a projector, in the first to third exemplary embodiments, a projector support table where the mounting hole is integrated with the intake air discharging port has been described. In the first exemplary embodiment, a projector support table where the mounting hole is integrated with the exhaust air taking port has been also described. However, the present disclosure is not limited to this structure. In order to correspond to a projector where the mounting unit and the intake hole are separately disposed, or to a projector where the mounting unit and the exhaust hole are separately disposed, the mounting hole and the intake air discharging port may be separately disposed or the mounting hole and the exhaust air taking port may be separately disposed in the projector support table.

In the first to third exemplary embodiments, a projector support table where a second intake passage and intake air discharging port are disposed in the right projector support unit in the view from the front has been described. However, the present disclosure is not limited to this structure. In order to correspond to a projector including an intake hole in the left mounting unit in the view from the front, for example, the projector support table may include a second intake passage and intake air discharging port in the left projector support unit in the view from the front. As necessary, the projector support table may include a first exhaust passage and exhaust air taking port in the right projector support unit in the view from the front.

In the first exemplary embodiment, a projector support table has been described where a first intake passage is disposed around the turning shaft and a second exhaust passage is disposed in the outer periphery of the first intake passage. However, the present disclosure is not limited to this structure. For example, a second exhaust passage may be disposed around the turning shaft and a first intake passage may be disposed in the outer periphery of the second exhaust passage. In that case, in the turning unit, an intake air taking port and exhaust air discharging port are disposed on the basis of the arrangement positions of the first intake passage and second exhaust passage.

In the first to third exemplary embodiments, a projector support table where the projector support unit is formed in a rectangular shape has been described. However, the present disclosure is not limited to this structure. The projector support unit may have any shape as long as the projector support unit can turnably support the projector. For example, the shape may be a cylindrical shape or another shape.

In the first to third exemplary embodiments, a projector support table where each of the turning unit and fixed unit is formed in a cylindrical shape has been described. However, the present disclosure is not limited to this structure. The turning unit and fixed unit may have other shapes.

In the first to third exemplary embodiments, a projector support table including a turning shaft formed in a cylindrical shape has been described. However, the present disclosure is not limited to this structure. The turning shaft may have any shape as long as the turning shaft can turnably support the turning unit. The turning shaft may have a shape other than a cylindrical shape—for example, a semispherical shape.

In the first to third exemplary embodiments, a projector apparatus has been described where the mounting unit in the projector is formed in a projecting shape and the mounting hole in the projector support unit is formed in a recessed shape. However, the present disclosure is not limited to this structure. In the projector apparatus, the mounting unit in the projector may be formed in a recessed shape, and the mounting hole in the projector support unit may be formed in a projecting shape.

In the present disclosure, the projector support unit may be configured to restrict the turning range of the projector. Alternatively, the projector support unit may be configured to fix and support the projector.

In the present disclosure, the projector support table may be configured to restrict the turning range of the turning unit. In that case, the first intake passage or second exhaust passage may be formed in accordance with the turning range.

In the third exemplary embodiment, a projector support table including no exhaust air taking port, no first exhaust passage, no exhaust air discharging port, no second exhaust passage, and no exhaust port has been described. However, the present disclosure is not limited to this structure. The projector support table of the third exemplary embodiment may include elements similar to the exhaust air taking port, first exhaust passage, exhaust air discharging port, second exhaust passage, and exhaust port that are shown in the first exemplary embodiment. In that case, the projector support table can support a projector having the same structure as that of projector 110 of the first exemplary embodiment.

The present disclosure does not restrict a means for taking intake air from the intake port in the projector support table. For example, a device (e.g. fan) for generating a suction force may be disposed in some place between the intake port and the intake air discharging port. Alternatively, a projector's force for sucking air may be utilized. This is similar to the exhaust air.

In the present disclosure, the positions of the intake port and exhaust port shown in the first to third exemplary embodiments may be interchanged.

The present disclosure is applicable to a projector apparatus where a projector is mounted on a projector support table. Specifically, the present disclosure is applicable to a projector apparatus and projector support table that are used for projection mapping.

What is claimed is:

1. A projector apparatus comprising:
a projector having a mounting unit; and
a projector support table for supporting the projector at the mounting unit,
wherein
the projector support table includes:
a turning unit having a projector support unit to which the mounting unit is attachable; and
a fixed unit having an intake port and turnably supporting the turning unit,
the fixed unit includes a first intake passage through which intake air taken from the intake port passes, and
the turning unit includes:
an intake air taking port for taking the intake air having passed through the first intake passage;

a second intake passage through which the intake air taken from the intake air taking port passes; and an intake air discharging port for discharging, to an intake hole of the projector, the intake air having passed through the second intake passage.

2. The projector apparatus according to claim 1, wherein when the turning unit is turned with respect to the fixed unit, the intake air taking port slides on the first intake passage.

3. The projector apparatus according to claim 1, wherein in the projector, the mounting unit is integrated with the intake hole, and in the turning unit, the projector support unit is integrated with the intake air discharging port.

4. The projector apparatus according to claim 1, wherein the projector support unit turnably supports the projector at the mounting unit.

5. The projector apparatus according to claim 1, wherein the turning unit includes:
- an exhaust air taking port for taking exhaust air of the projector, the exhaust air being discharged from an exhaust hole of the projector;
- a first exhaust passage through which the exhaust air taken from the exhaust air taking port passes; and
- an exhaust air discharging port for discharging the exhaust air having passed through the first exhaust passage, and the fixed unit includes:
- a second exhaust passage through which the exhaust air discharged from the exhaust air discharging port passes; and
- an exhaust port for discharging the exhaust air having passed through the second exhaust passage.

6. The projector apparatus according to claim 5, wherein when the turning unit is turned with respect to the fixed unit, the exhaust air discharging port slides on the second exhaust passage.

7. The projector apparatus according to claim 5, wherein the projector includes the pair of mounting units, one of the pair of mounting units is integrated with the intake hole, and the other of the pair of mounting units is integrated with the exhaust hole, the turning unit includes the pair of projector support units, and one of the pair of projector support units is integrated with the intake air discharging port, and the other of the pair of projector support units is integrated with the exhaust air taking port.

8. A projector support table comprising:
a turning unit having a projector support unit to which a projector is attachable; and
a fixed unit having an intake port and turnably supporting the turning unit,
wherein the fixed unit includes a first intake passage through which intake air taken from the intake port passes, and the turning unit includes:
- an intake air taking port for taking the intake air having passed through the first intake passage;
- a second intake passage through which the intake air taken from the intake air taking port passes; and
- an intake air discharging port for discharging, to an intake hole of the projector, the intake air having passed through the second intake passage.

9. The projector support table according to claim 8, wherein when the turning unit is turned with respect to the fixed unit, the intake air taking port slides on the first intake passage.

10. The projector support table according to claim 8, wherein in the turning unit, the projector support unit is integrated with the intake air discharging port.

11. The projector support table according to claim 8, wherein the projector support unit turnably supports the projector.

12. The projector support table according to claim 8, wherein the turning unit includes:
- an exhaust air taking port for taking exhaust air of the projector, the exhaust air being discharged from an exhaust hole of the projector;
- a first exhaust passage through which the exhaust air taken from the exhaust air taking port passes; and
- an exhaust air discharging port for discharging the exhaust air having passed through the first exhaust passage, and the fixed unit includes:
- a second exhaust passage through which the exhaust air discharged from the exhaust air discharging port passes; and
- an exhaust port for discharging the exhaust air having passed through the second exhaust passage.

13. The projector support table according to claim 12, wherein when the turning unit is turned with respect to the fixed unit, the exhaust air discharging port slides on the second exhaust passage.

14. The projector support table according to claim 12, wherein the turning unit includes the pair of projector support units, and one of the pair of projector support units is integrated with the intake air discharging port, and the other of the pair of projector support units is integrated with the exhaust air taking port.

* * * * *